United States Patent [19]

Debesis

[11] Patent Number: 4,940,308
[45] Date of Patent: Jul. 10, 1990

[54] LASER BEAM STOP

[75] Inventor: John R. Debesis, Penfield, N.Y.

[73] Assignee: Eastman Kodak Company, Rochester, N.Y.

[21] Appl. No.: 211,938

[22] Filed: Jun. 27, 1988

[51] Int. Cl.$^5$ .................... G02B 27/46; G02B 27/58
[52] U.S. Cl. .................. 350/162.2; 350/319; 372/103
[58] Field of Search ........... 350/162.2, 162.17, 162.24, 350/319; 372/103

[56] References Cited

U.S. PATENT DOCUMENTS

| 3,286,193 | 11/1966 | Koester et al. | 372/103 |
| 3,578,849 | 5/1971 | Guillet | 372/103 |
| 3,935,545 | 1/1976 | Campillo et al. | 372/103 |
| 3,980,397 | 9/1976 | Judd et al. | 372/103 |
| 4,108,621 | 8/1978 | Asahara et al. | 350/319 |
| 4,469,407 | 9/1984 | Cowan et al. | 350/162.17 |
| 4,633,171 | 12/1986 | Storck et al. | 350/162.2 |

FOREIGN PATENT DOCUMENTS 0800940  1/1981  U.S.S.R. ........................ 350/162.2

OTHER PUBLICATIONS

Quintanilla et al., "Holographic Filter that Transforms a Gaussian into a Uniform Beam"; *Applied Optics*, vol. 20, No. 5; Mar. 1981; pp. 879–880.

*Primary Examiner*—Bruce Y. Arnold
*Assistant Examiner*—Terry S. Callaghan
*Attorney, Agent, or Firm*—Thomas H. Close

[57] ABSTRACT

A soft-edge stop for a laser beam includes a passing zone, a transition zone and a blocking zone. The transition zone includes a diffraction grating the diffraction efficiency of which varies progressively between a first value adjacent the passing zone and a second value adjacent the blocking zone. The passing zone may be clear, transmissive diffractive or reflective diffractive and the transition zone would be transmissive reflective in the first two cases and reflective diffractive in the third case.

13 Claims, 11 Drawing Sheets

FIG. 5

B = LIGHT EFFECTIVELY BLOCKED, BLOCKING ZONE

T = TRANSITION ZONE

P = LIGHT EFFECTIVELY PASSED, PASSING ZONE

⇒ = INCIDENT LIGHT

→ = ALL INCIDENT LIGHT PASSED WITHOUT DIFFRACTION

↗ = SUBSTANTIALLY ALL INCIDENT DIFFRACTED

⇍⇌ = SOME INCIDENT LIGHT DIFFRACTED AND SOME INCIDENT LIGHT PASSED WITHOUT DIFFRACTION

| = ALL INCIDENT LIGHT ABSORBED OR REFLECTED BY STOP

⊢ = USEFUL "PASSED" LIGHT IS PARALLEL TO LIGHT INCIDENT ON STOP

⊻ = USEFUL "PASSED" LIGHT IS INCLINED TO LIGHT INCIDENT ON STOP

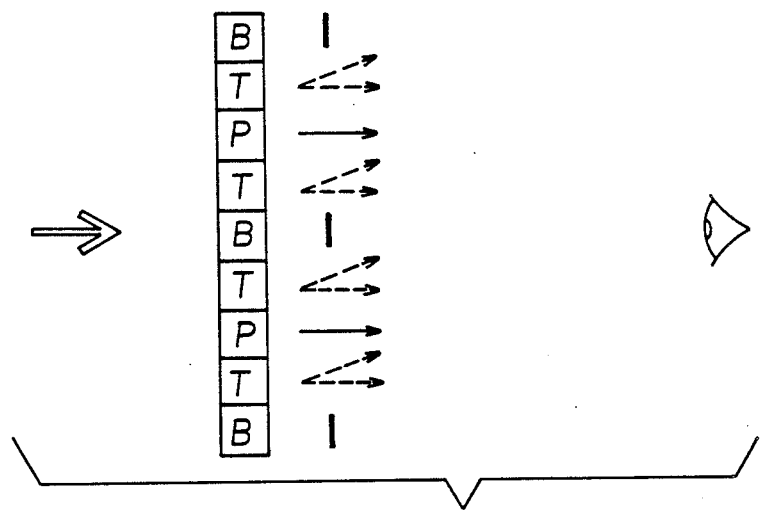
FIG. 15
FIG. 16
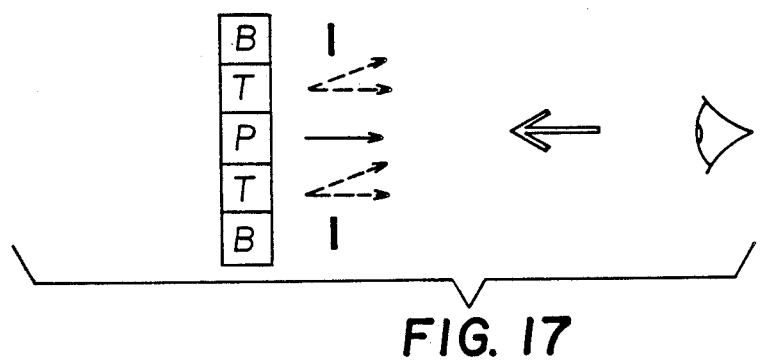
FIG. 17

LASER BEAM STOP

BACKGROUND OF THE INVENTION

1. Field of the Invention

This invention relates to stops for coherent beams of radiation.

2. Description Relative to the Prior Art

If a coherent beam of radiation, such as is generated by a gas or solid state laser, is truncated by a stop, for example, stop 18 illustrated in FIG. 1a of the accompanying drawings, which consists of a hole 20 in a piece 22 of metal, the sharp edge 24 of the hole 20 causes the beam to diffract at the edge of the hole. FIG. 1b is a plot of the optical density of the stop 18 against the position x across the stop, and FIG. 1c is a plot of the % light passed against position x across the stop illustrated in FIG. 1a. The diffraction at the edge of the hole causes an interference pattern in the beam downstream of the hole 20. The presence of the interference pattern in the beam is undesirable for many purposes. For example, if the laser and the stop were to be used in a laser printer, the interference pattern would cause the size of the stop on the photoreceptor to be increased. At least in high resolution printers, a small spot size is desirable and such an increase in the spot size would be undesirable. To avoid any interference-producing truncation of the beam, all of the optical elements would have to be made very large, with consequent high cost. The undesirable interference patterns caused by beam truncation are encountered, and are undesirable, also in laser fusion systems, video disk players and recorders, inter alia. Thus, it is apparent that there is a need to minimize the interference effects caused by truncating a laser beam.

U.S. Pat. No. 3,935,545 describes a method and apparatus for reducing diffraction-induced damage in high power laser amplifier systems. In particular, it discloses appropriately tailoring a laser beam profile by passing the beam through an aperture having a uniformly high optical transmission within a particular radius and a transmission which drops gradually to lower and lower values at progressively greater radii. An example of such a stop is stop 26 illustrated in FIG. 2a of the accompanying drawings which consists of a piece 28 of clear sheet glass which has been rendered opaque in the cross-hatched region 30. In the central, disc-shaped area 32 there is 100% transmission, i.e. the stop is clear in the area 32. In the annulus 34, which is hatched in FIG. 2a, the transmission varies from 100% adjacent the clear area 32 to 0% adjacent the opaque region 30. Thus, there is a gradient in the optical density along radii of the aperture, beginning at the outer radius of the disc-shaped area 32 and ending at the inner radius of the opaque region 30. Such an aperture may be described as having a soft edge, and its transmission efficiency, i.e. % light "passed", is illustrated in FIG. 2b.

Another method of fabricating soft-edge apertures, which is commoly in use, involves specialized thin film patterning techniques in which a thin film of chrome or other opaque material is deposited on a glass substrate. The soft aperture is patterned into the film during deposition by a mechanical device to provide a gradient in the optical density at the edge of the aperture.

The fabrication of known soft-edge aperture is difficult and expensive.

SUMMARY OF THE INVENTION

It is an object of the present invention to provide a soft-edge aperture which is both effective as a soft-edge aperture and may be manufactured economically.

In accordance with the present invention a soft-edge stop for a laser beam includes a passing zone, blocking zone and a transition zone between the passing zone and the blocking zone. The transition zone includes a diffraction grating. The diffraction efficiency of the diffraction grating has a first value adjacent the passing zone and a second value adjacent the blocking zone and varies between the first and second values elsewhere.

In one embodiment of the present invention, there is a stop member which bears the blocking zone and the transition zone. The stop member has a clear area forming the passing zone. In such an embodiment, the blocking zone may be either opaque or a diffraction grating which diffracts substantially all of the incident light. In embodiments in which the blocking zone is a diffraction grating, the light which has been diffracted by the diffraction grating is directed differently to the light which has passed through the clear passing zone and, being differently directed, it is not incident on, or is otherwise not accepted by, the optical system downstream of the stop. Hence, light which has been diffracted by the blocking zone is as effectively blocked as in the case of an opaque blocking zone. The diffraction grating in the transition zone has a very low efficiency adjacent the passing zone, so that only a small percentage of the incident light is diffracted and goes in a direction different to that of the light which has passed through the passing zone. The transition zone diffraction grating has a very high efficiency adjacent the blocking zone so that most of the light incident thereon is diffracted. The diffraction efficiency of the diffraction grating in the transition zone varies between very low values, adjacent the passing zone, and very high values, adjacent the blocking zone. The clear area may be an aperture in the stop member. Thus, the blocking zone blocks the light by redirecting it, by diffraction, away from the beam passed by the passing zone.

BRIEF DESCRIPTION OF THE DRAWINGS

Embodiments of the present invention will now be described, by way of example, with reference to the accompanying drawings of which FIGS. 1a, 1b, 1c, 2a, 2b illustrate prior art, and in which:

FIG. 1a illustrates a known stop formed as a sharp-edged hole in a piece of metal;

FIG. 1b is a plot of the optical density against position across the stop illustrated in FIG. 1a;

FIG. 1c is a plot of the % light "passed" against position across the known stop illustrated in FIG. 1a.;

FIG. 2a illustrates a known soft-edge stop;

FIG.2b is a plot of the transmission efficiency (i.e. % light "passed") by the stop illustrated in FIG. 2a;

FIG. 3b is a plot of the diffraction efficiency against position across the stop for the stop illustrated in FIG. 3a;

FIG. 3c is a plot of the % light "passed" against position across the stop for the stop illustrated in FIG. 3a;

FIG. 5 is a legend of the symbols used in the ensueing FIG. 6 to 23; and

FIGS. 6 to 23 are diagrammatic representations of seventeen embodiments of the present invention, with FIG. 6 representing the embodiment illustrated in FIGS. 3 and 4.

DETAILED DESCRIPTION OF THE PREFERRED EMBODIMENT

Figure 1A:
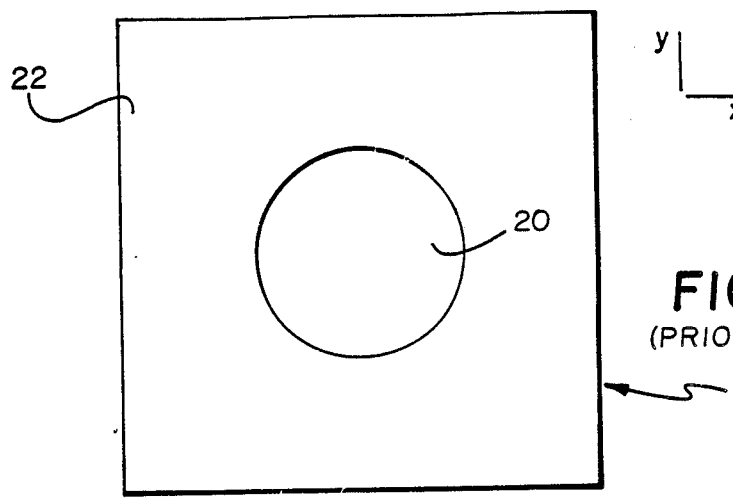
Figure 1B:
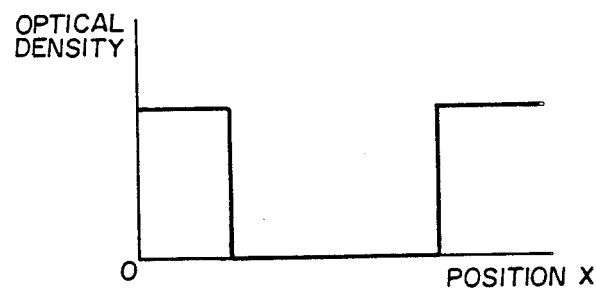
Figure 1C:
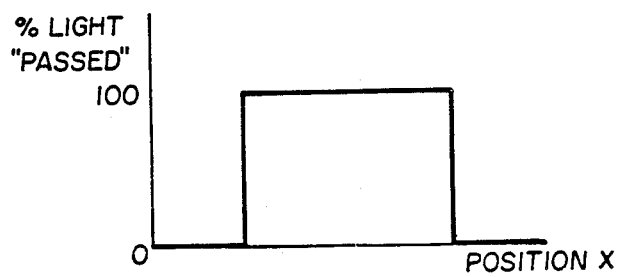
Figure 2A:
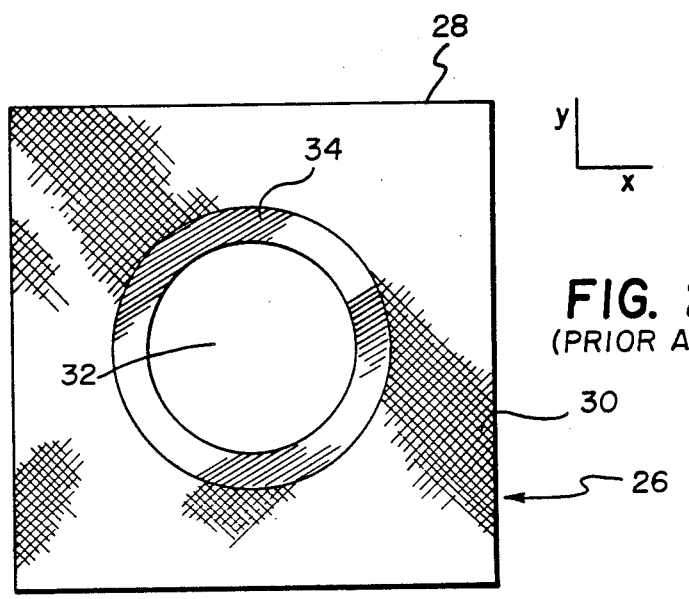
Figure 2B:
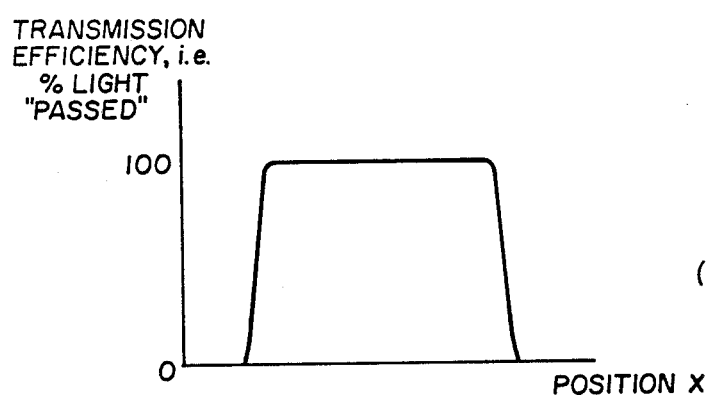
Figure 3A:
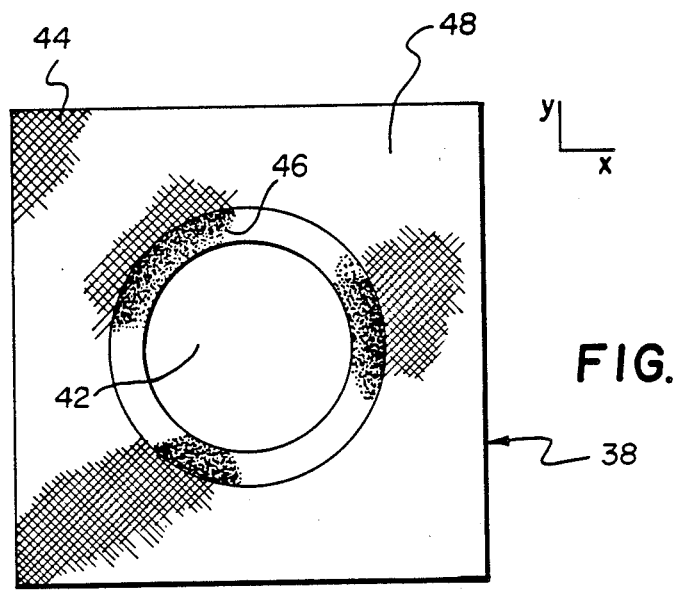
FIG. 3a illustrates one embodiment of stop in accordance with the present invention.
Figure 3B:
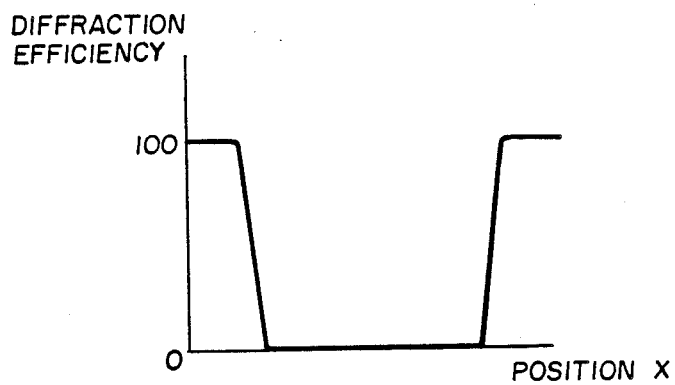
Figure 3C:
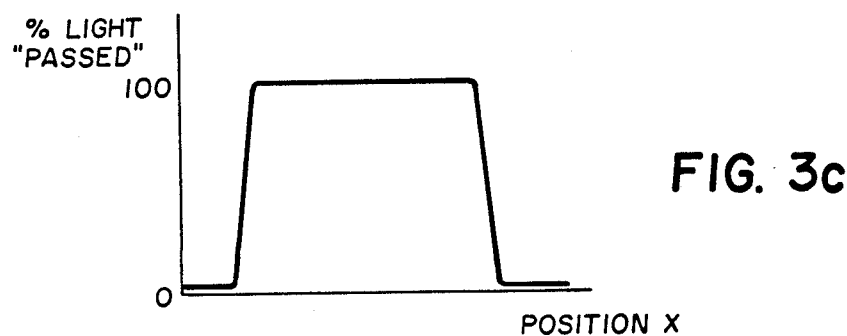

FIGS. 3a to 6 illustrate a first embodiment of the present invention, which is a stop 38 and includes a rectangular piece 40 of optical, planar glass on which is formed, except in central, disc-shaped area 42, a diffraction grating pattern 44. The pattern 44 includes an annular region 46, contiguous with the clear area 42, with a varying diffraction efficiency, and the entire region 48 of the stop radially outside the region 46, which has a maximum diffraction efficiency. Those skilled in the art know that diffraction efficiencies in excess of 95% are achievable.

Figure 4:
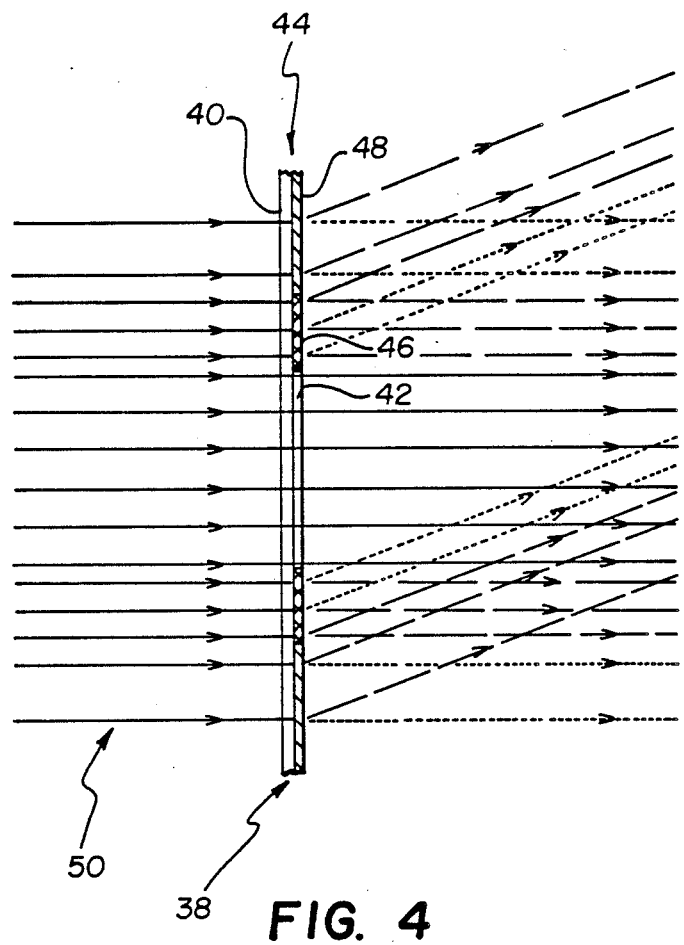
FIG. 4 illustrates a cross-section through the stop illustrated in FIG. 3a and the effect thereof on light incident on the stop.
Figure 6:
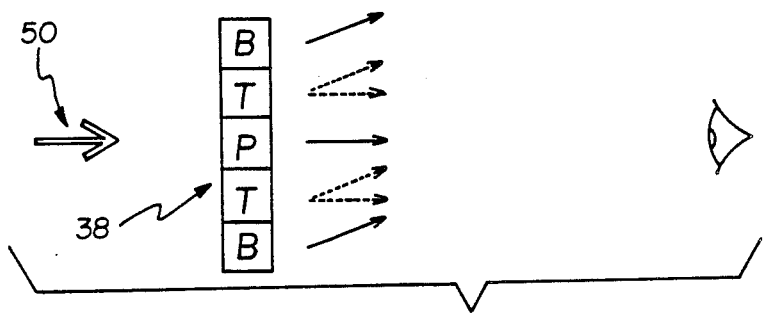

FIG. 4 is a cross-section through the stop 38 and illustrates the effect of the stop on light 50 incident on it. It will be seen that the light 50 incident on the clear central disc-shaped area 42 passes straight through the stop 38. Light 50 which is incident on the blocking region 48 radially outside the annular region 45 is substantially all diffracted, i.e., only a few percent, depending on the maximum diffraction efficiency achievable, is transmitted without diffraction. Light 50 incident on the annular region 46, is both transmitted without diffraction and diffracted. The ratio of light transmitted without diffraction to light diffracted, varies in the annular region and adjacent the disc-shaped area 42 substantially all the light is passed and substantially no light is diffracted, whereas adjacent the region 48, substantially all the light is diffracted and substantially no light is passed. Thus, the diffraction efficiency of the diffraction grating in the annular, transition region 46 has a first value adjacent the passing zone, which is central disc-shaped area 42, and second value adjacent the blocking zone, which is the region 48, and varies between these values elsewhere. As is illustrated in FIG. 6, it is assumed that the stop 38 is being used in such a manner that it is light which leaves the stop parallel with the incident light 50 which is regarded as passed by the stop 38. The optical system which uses the light "passed" by the stop is represented in FIG. 6, as in the Figures illustrating other embodiment herein, by an eye symbol which is positioned and oriented to indicate whether rays parallel to, angularly displaced relative to, the incident light, are accepted. For an understanding of the symbols used in FIGS. 6 to 23, reference is directed to the legend which constituteds FIG. 5.

The stop described above with reference to FIGS. 3a to 6, may be manufactured in the following manner. The piece of glass 40 is coated with positive photoresist. A chrome-on-glass photomask is plase over the coating. The photomask has maximum density in a disc-shaped region corresponding to the disc-shaped area 42, that is, the passing zone, of the stop 38. Around the maximum density region of the photomask, there is an annular region of decreasing density which decreases to zero density at the radius of the radially inner boundary of the region 48, that is, the blocking zone, of the stop 38. Thus, there is a gradient, in the radial direction, in the photomask between the central opaque region and the peripheral clear region. The photomask may be made by coating a thin film of chrome or other opaque material on the glass substrate. The gradient region is created by using a mechanical device to provide a gradient in the optical density.

With the photomask in position, an interference pattern is created on the photoresist by means known to those skilled in the art, so that no description is given herein. The photoresist is exposed to the interference pattern through the photomask. After exposure, the glass substrate bearing the exposed photoresist is subjected to a known etching process which causes the central, disc-shaped area to be clear; the region 48 to have a diffraction grating pattern with maximum groove depth in the sinusoidal grating pattern; and the annular region 46 to have a sinusoidal groove pattern the depth of the grooves of which varies from zero adjacent the central, disc-shaped region to maximum adjacent the region 48. Thus, while the chrome on glass photomask is expensive to make, it is used as a tool, many times over, in making soft-edge stops in accordance with the present invention, whereas in the prior art it constituted the stop.

Figure 7:
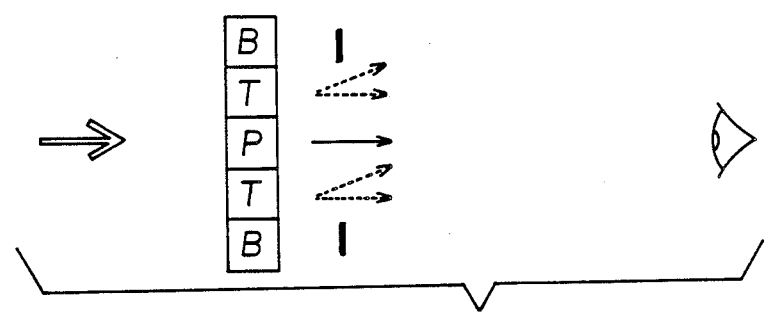

FIG. 7 illustrates a second embodiment of the present invention which, again, is a transmission stop. In this second embodiment, the blocking zone is opaque or reflective and light which passes through the passing zone is light which leaves the stop substantially parallel to the incident light. Again, in the transition zone, light is partially diffracted and partially passed straight through, with the ratio varying with radial distance from the center of the passing zone. Thus, an optical system which is intended to use light passed by the stop is located and directed approximately as indicated by the eye symbol in FIG. 7.

Figure 8:
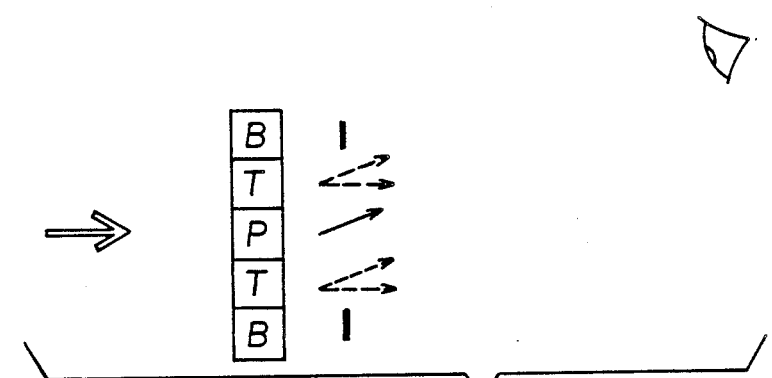

FIG. 8 illustrates a third embodiment of the present invention which, again, is a transmission stop. However, in this third embodiment that light which is regarded as "passed" is light which has been diffracted by the stop and the light which is blocked is absorbed or reflected by the stop.

Figure 9:
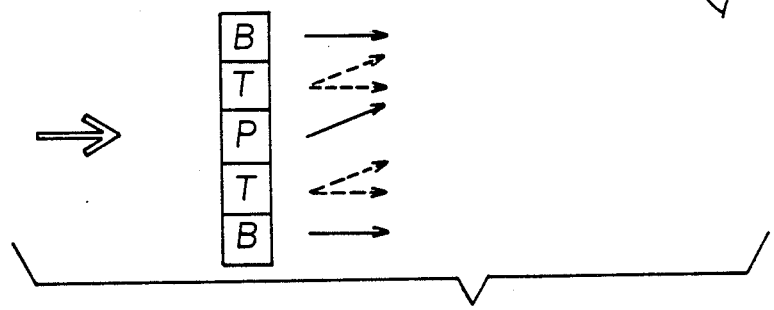

FIG. 9 illustrates a fourth embodiment of the present invention which, again, is a transmission stop. In this fourth embodiment that light which is regarded as passed is light which has been diffracted and light which is effectively blocked is light which leaves the stop in a direction parallel to the incident light. Thus, an optical system for using the light passed by the stop is located and directed approximately as represented by the eye symbol in FIG. 9.

FIGS. 10 to 13 illustrate fifth to eighth embodiments of the present invention which have in common that the passing zone of the stop is an outer annulus and the blocking zone is a central disc-shaped zone.

Figure 10:
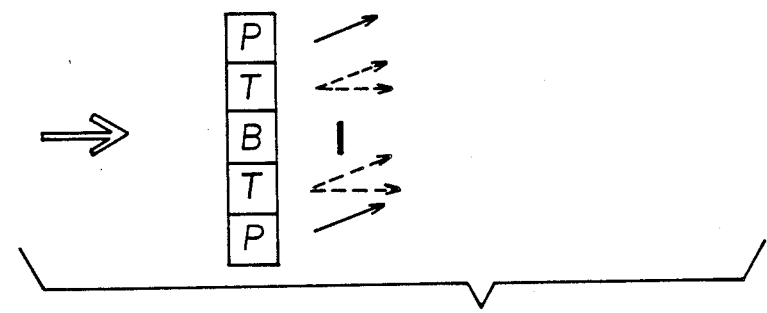

In FIG. 10, the passing zone of the fifth embodiment diffracts substantially all light incident on it an an optical system using the "passed" light is located and directed approximately as indicated by the eye symbol. The blocking zone either absorbs or reflects the light incident on it.

Figure 11:
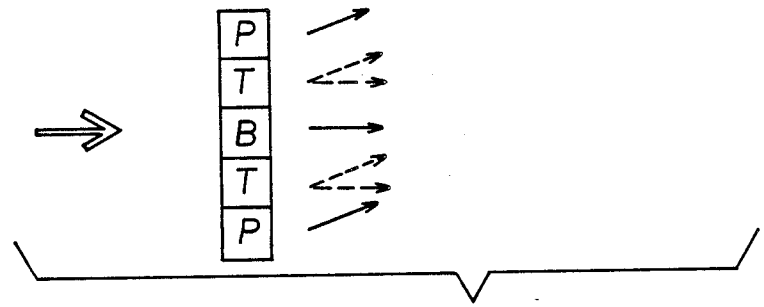

The sixth embodiment, illustrated in FIG. 11, is similar to the fifth embodiment, except that the blocking zone is clear and allows light incident on it to go straight through the stop so that the light emergent from the blocking zone is parallel to the incident light, but it does, of course, miss the optical system for using the "passed" light, which optical system is represented in position and direction by the eye symbol.

Figure 12:
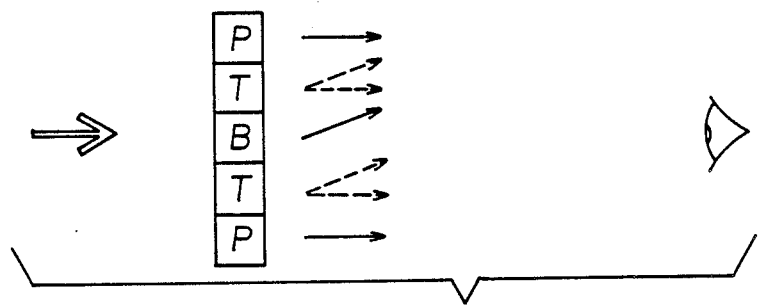
Figure 13:
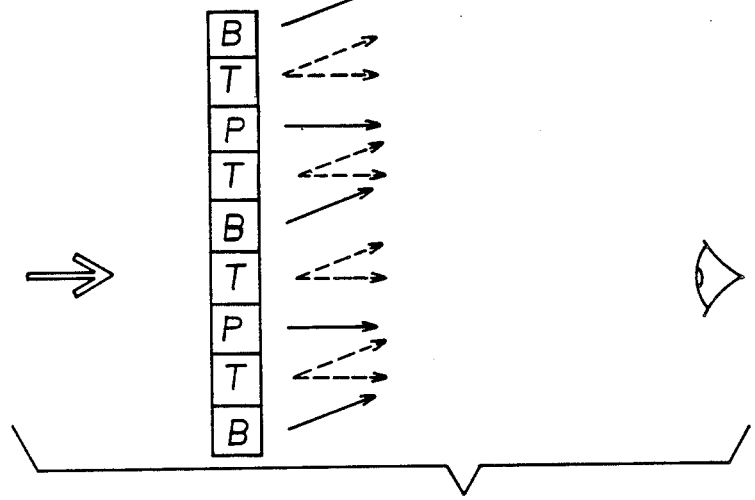

FIG. 12 represents a seventh embodiment of the present invention in which the passing zone is a zone through which light goes without diffraction and the blocking zone is a zone wherein substantially all the incident light is diffracted. The optical system using the light "passed" by the stop is represented by the eye symbol. In this embodiment, because the "passed" light is light parallel to the incident light and because the passing zone is disposed radially outwardly of the transition and blocking zones, if it is desired that the passed light be stopped at its radially outer, as well as its radially inner periphery, a soft edge is provided, in accordance with the present invention, also at its radially outer periphery. Such radially outer soft edge includes an annular transition zone and, radially outside that, a blocking zone. Such an embodiment, the eighth, is represented in FIG. 13.

Figure 14:
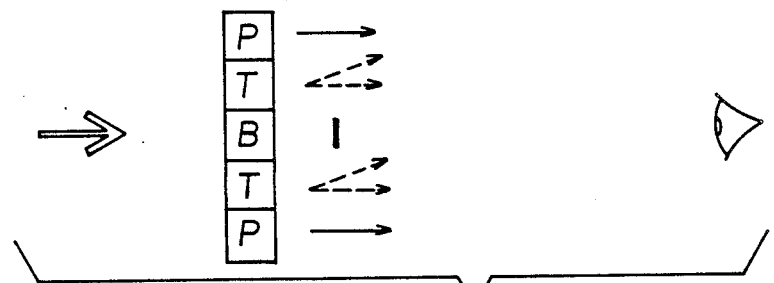

A ninth embodiment of the present invention is illustrated in FIG. 14, in which there is a central, disc-shaped blocking zone, surrounded by an annular transition zone in turn surrounded by an annular passing zone. An optical system for using the light "passed" by the passing zone is represented, in approximate location and orientation, by the eye symbol. If it is desired that the radially outer periphery of the annnulus of "passed" light be bounded also, a soft edge, in accordance with the present invention, may be provided and such an embodiment, the tenth, is illustrated in FIG. 15 of the drawings. In FIG. 15, there is an annular transition zone around the passing zone and there is an annular blocking zone around the transition zone.

In all of the embodiments so far described, the light which is "passed" emerges from the side of the stop opposite to the side at which light was incident, and where there is diffraction it is by transmissive diffraction gratings. Embodiments of the present invention may also be constructed in which the diffraction gratings are reflective. Some such embodiments are respresented in FIGS. 16 to 23 and in these FIGS. the incident light is directed from the right, as opposed to from the left in the preceding embodiments, and the optical system (represented by the eye symbol) using the "passed" light is, again, to the right of the stop, as seen in the FIGS.

In the tenth embodiment, represented in FIG. 16, the passsing zone is a reflecting zone and the blocking zone is a reflective diffraction grating which diffracts substantially all and reflects all, of the light incident on it. The transition zone reflects all of the light incident on it an diffracts some of it, the amount diffracted being zero adjacent the blocking zone and a maximum adjacent the passing zone and varying between those two values progressively. The optical system using the light "passed" by the stop, is represented in both location and orientation by the eye symbol in the drawing.

The eleventh embodiment of the invention, represented in FIG. 17, is similar to the tenth embodiment represented in FIG. 16, but in the eleventh embodiment the blocking zone is absorptive.

Figure 18:
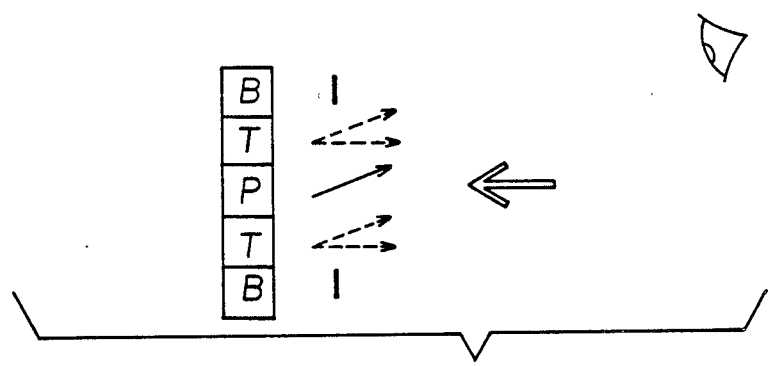

The twelfth embodiment is represented in FIG. 18 and in it the passing zone is a reflective diffractive grating; the blocking zone is absorptive and the transition zone is reflective and diffractive with the difraction efficiency decreasing from a maximum adjacent the passing zone to a minimum adjacent the blocking zone. The optical system using the light "passed" by the stop is represented in location and orientation by the eye symbol.

Figure 19:
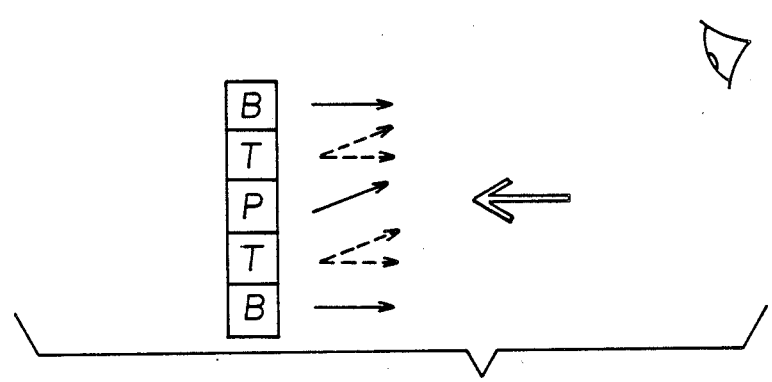

The thirteenth embodiment, represented in FIG. 19, is similar to the twelfth embodiment but differs in that the blocking zone is reflective. It will be observed, from the orientation of the optical system using the light "passed" by the stop, that light which is reflected but not also diffracted, is not accepted by the equipment.

Figure 20:
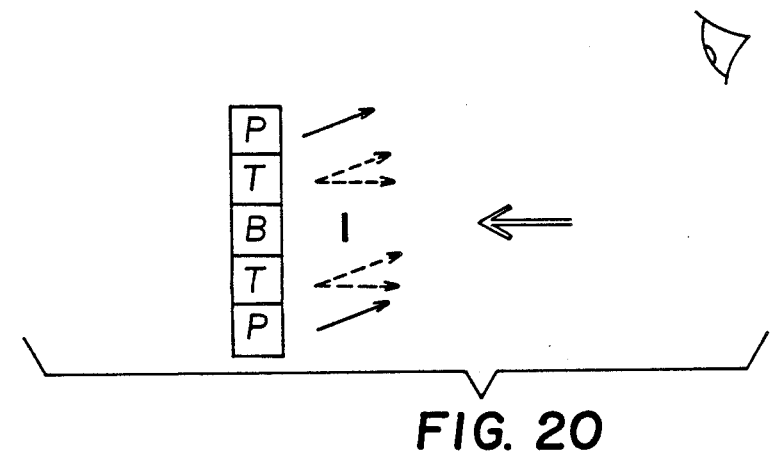
Figure 21:
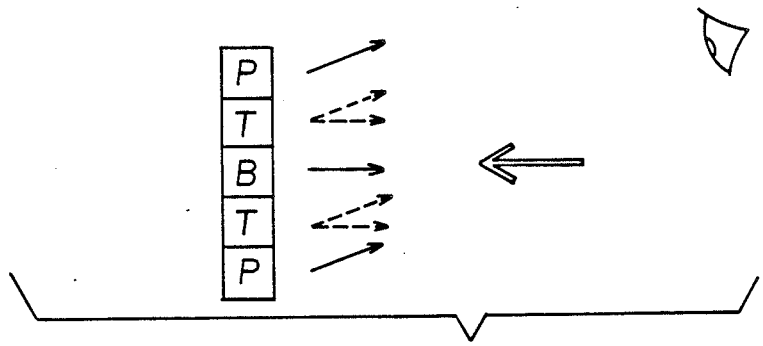

The fourteenth embodiment to be described, is represented in FIG. 20, in which it will be seen that the blocking zone is central and the passing zone is annular and is located radially outwardly of a transition zone which is contiguous with the blocking zone. In this embodiment the blocking zone is absorptive and in the fifteenth embodiment, represented in FIG. 21, which is otherwise similar to the fourteenth embodiment, the blocking zone is reflective.

Figure 22:
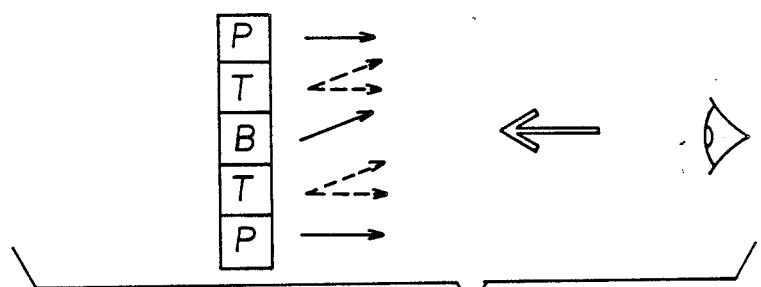
Figure 23:
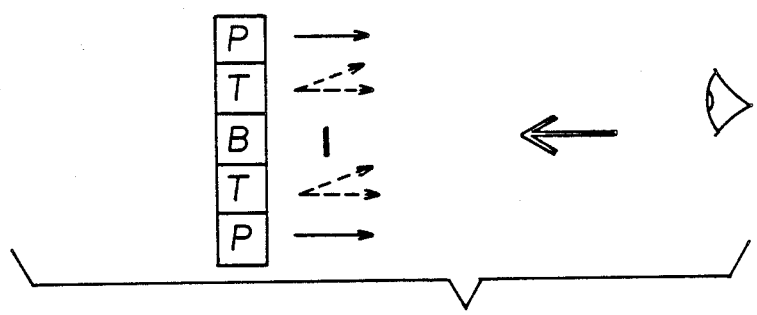

The sixteenth embodiment to be described, is represented in FIG. 22. In this embodiment the passing zone is an annulus outside an annular transition zone around a disc-shaped blocking zone. The passing zone is purely reflective; the blocking zone is reflective diffractive with a maximum diffraction efficiency; and the transition zone is reflective and is diffractive with a diffraction efficiency which varies from a maximum adjacent the blocking zone to zero adjacent the passing zone. The optical system using the light "passed" by the passing zone is located and oriented as indicated by the eye symbol in FIG. 22. The seventeenth embodiment to be described is representedd in FIG. 23 and is similar to the sixteenth embodiment, represented in FIG. 22, but differs in that the blocking zone is absorptive.

In those embodiments of the present invention, described above, which include a passing zone which transmits light without diffraction, the substrate material, bearing the photoresist, is continuous across the passing zone. It will be realized that the substrate material could be discontinous or non-existent in such a passing zone. Similarly, in embodiments in which the blocking zone transmits light without diffraction, the substrate material could be dicontinuous or non-existent in such blocking zones.

One way of fabricating a stop in accordance with the present invention has been described above. Another method of fabrication involves double exposure of the photoresist. In this second method of fabrication, a diffraction grating is recorded in the photoresist in a conventional manner. However, before the photoresist is processed, a contact exposure is made using an ultraviolet exposure system and a chrome on glass photomask with a soft aperture, such as that described above. After processing of the photoresist, there is a diffraction grating pattern with a gradient in the diffraction efficiency in the transition zone of the stop.

The methods for fabrication of stops in accordance with the present invention, described above, involve the use of relatively expensive photomasks. However, the stops produced may be of hight quality. When the quality needs are less, reflective grating apertures can be embossed into metalized plastic very economically.

It will be recognized that in many of the embodiments described above, light incident on the blocking zone is not absorbed but is transmitted or reflected or diffracted or reflected/diffracted. When such light is not absorbed, it is distinguished from the light that is "passed" in that it is directed differently to the light that is "passed". The "blocked" light is directed so differently that it passes out of the optical system. This "blocked" light can be used for monitoring the power of the light source, for example a laser diode, or for other control functions.

It has been proposed that laser scanners include a fixed diffraction grating usptream of the rotating hologon, for the purpose of ameliorating the effect of a frequency change in the output of the laser diode. A stop in accordance with the present invention and in which the "passed" light is diffracted by a central disc-shaped passing zone, may form the stationary grating upstream of the hologon and perform both the function of the stationary grating and as a stop.

The invention has been described in detail with particular reference to a presently preferred embodiment, but it will be understood that variations and modifications can be effected within the spirit and scope of the invention.

What is claimed is:

1. A soft-edge stop for a laser beam, including:
a passing zone, a blocking zone and a transition zone between said passing zone and said blocking zone;
said transition zone including a diffraction grating, the diffraction effeciency of said diffraction grating having a first value adjacent said passing zone, a second, different value adjacent said blocking zone and varying, in diffraction efficiency, between said first and second values elsewhere in the transition zone.

2. A soft-edge stop as claimed in claim 1, including:
a stop member bearing said blocking zone and said transition zone;
said stop member having a clear area forming said passing zone.

3. A soft-edge stop as claimed in claim 2, wherein:
said stop member is formed of glass and is continuous across said passing zone.

4. A soft-edge stop as claimed in claim 2, wherein:
said clear area is disc-shaped and said transition zone is annular.

5. A soft-edge stop as claimed in claim 2, wherein:
said diffraction grating in said transition zone is a transmission grating and has least efficiency adjacent said clear area and greatest efficiency adjacent said blocking zone whereby little light in the laser beam incident on the transition zone adjacent the passing zone is diffracted by the grating and substantially all light incident on the transition zone adjacent the blocking zone is diffracted by the grating, diffracted light having a direction after diffraction different to that of the portion of the beam passing through the clear area.

6. A soft-edge stop as claimed in claim 5, wherein:
said blocking zone includes a diffraction grating having maximum diffraction efficiency.

7. A soft-edge stop as claimed in claim 5, wherein:
said blocking zone is opaque or reflective.

8. A soft-edge stop as claimed in claim 1, including:
a stop member bearing said passing zone and said transition zone;
said passing zone including a diffraction grating for diffracting light incident on it, whereby light incident on it has a direction after diffraction different to the direction of the incident light;
said diffraction grating in said transition zone being so formed that light incident on it adjacent said passing zone is diffracted similarly to light in said passing zone.

9. A soft-edge stop as claimed in claim 8, wherein:
said diffraction gratings in said passing zone and said transition zone are both of the transmissive type.

10. A soft-edge stop as claimed in claim 8, wherein:
said diffraction gratings in said passing zone and said transition zone are both of the reflective type.

11. A soft-edge stop as claimed in claim 1, including:
a stop member having an opaque disc-shaped zone forming said blocking zone and an annular zone around and contiguous with said disc-shaped zone forming said transition zone, said first value of said diffraction efficiency being such that substantially no laser light incident on the transition zone adjacent said blocking zone is passes undiffracted by said diffraction grating, and said second value of said diffraction efficiency is such that substantially all of the laser light incident on said transition zone adjacent said passing zone is passed undiffracted by said diffraction grating.

12. A soft-edge stop as claimed in claim 11, wherein:
the diffraction grating in the transition zone is a reflection type grating.

13. A soft-edge stop as claimed in claim 11, wherein:
the diffraction grating in the transition zone is a transmission grating.

* * * * *